US011992153B2

(12) United States Patent
Sands et al.

(10) Patent No.: US 11,992,153 B2
(45) Date of Patent: *May 28, 2024

(54) COOKING GAP CONTROL OF A COOKING APPARATUS

(71) Applicant: TAYLOR COMMERCIAL FOODSERVICE, LLC, Rockton, IL (US)

(72) Inventors: Jeffrey L. Sands, Freeport, IL (US); Ronald J. Glavan, Rockton, IL (US); Dennis J. Nelson, Rockton, IL (US); Otley D. Freymiller, Deerfield, WI (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,035

(22) Filed: Feb. 21, 2023

(65) Prior Publication Data

US 2023/0190037 A1 Jun. 22, 2023

Related U.S. Application Data

(63) Continuation of application No. 17/460,603, filed on Aug. 30, 2021, now Pat. No. 11,589,708, which is a (Continued)

(51) Int. Cl.
*A47J 37/06* (2006.01)
(52) U.S. Cl.
CPC .... *A47J 37/0611* (2013.01); *A47J 2037/0617* (2013.01)

(58) Field of Classification Search
CPC .................................................. A47J 37/0611
See application file for complete search history.

(56) References Cited

U.S. PATENT DOCUMENTS 3,776,124 A 12/1973 Morley
4,444,094 A 4/1984 Baker et al.
(Continued)

FOREIGN PATENT DOCUMENTS

EP 2007257 12/2008
JP H08-202451 8/1996
(Continued)

OTHER PUBLICATIONS

International Search Report for application PCT/US2014/028661, dated Mar. 14, 2014, 4 pages.
(Continued)

*Primary Examiner* — Steven N Leff
(74) *Attorney, Agent, or Firm* — Barnes & Thornburg LLP

(57) ABSTRACT

A method of controlling a cooking apparatus includes identifying an initial thickness of a food product on a lower heating plate of the cooking apparatus and calculating a difference between an initial gap value corresponding to the initial thickness of the food product and a predefined final gap value. The method includes controlling at least one of a pressure of at least one of an upper heating plate and a lower heating plate on the food product, a rate of descent of the upper heating plate toward the lower heating plate, and a rate of ascent of the lower heating plate toward the upper heating plate based on the calculated difference between the initial gap value and the predefined final gap value.

12 Claims, 3 Drawing Sheets

Related U.S. Application Data continuation of application No. 14/775,294, filed as application No. PCT/US2014/028661 on Mar. 14, 2014, now Pat. No. 11,116,357.

(60) Provisional application No. 61/798,241, filed on Mar. 15, 2013.

(56) References Cited

U.S. PATENT DOCUMENTS

| | | | |
|---|---|---|---|
| 4,627,335 | A | 12/1986 | Sherman et al. |
| 5,095,813 | A | 3/1992 | Escamilla |
| 5,755,150 | A | 5/1998 | Matsumoto et al. |
| 5,802,958 | A | 9/1998 | Hermansson |
| 5,847,365 | A | 12/1998 | Harter et al. |
| 5,934,182 | A | 8/1999 | Harter et al. |
| 6,016,743 | A | 1/2000 | Glavan |
| 6,079,321 | A | 6/2000 | Harter |
| 7,082,941 | B2 | 8/2006 | Jones et al. |
| 7,878,109 | B2 | 2/2011 | Calzada et al. |
| 7,954,422 | B2 | 6/2011 | Nevarez et al. |
| 8,359,970 | B2 | 1/2013 | Calzada et al. |
| 8,372,459 | B2 | 2/2013 | Owensby et al. |
| 8,555,777 | B2 | 10/2013 | Calzada et al. |
| 8,739,692 | B2 | 6/2014 | Calzada et al. |
| 8,833,243 | B2 | 9/2014 | Sands et al. |
| 8,863,652 | B2 | 10/2014 | Nevarez et al. |
| 2007/0077338 | A1 | 4/2007 | Calzada et al. |
| 2007/0251518 | A1 | 11/2007 | Calzada |
| 2012/0148713 | A1 | 6/2012 | Owensby et al. |
| 2012/0237657 | A1 | 9/2012 | Nevarez et al. |
| 2013/0071534 | A1 | 3/2013 | Newton |
| 2014/0023755 | A1 | 1/2014 | Claesson et al. |
| 2014/0161953 | A1 | 6/2014 | Jones et al. |
| 2015/0108110 | A1 | 4/2015 | Freymiller et al. |
| 2015/0145503 | A1 | 5/2015 | Freymiller et al. |
| 2015/0305554 | A1 | 10/2015 | Dorsten et al. |
| 2015/0305555 | A1 | 10/2015 | Nelson |
| 2015/0305556 | A1 | 10/2015 | Nelson |
| 2015/0305557 | A1 | 10/2015 | Nelson |
| 2015/0305558 | A1 | 10/2015 | Nelson et al. |
| 2016/0037958 | A1 | 2/2016 | Freymiller et al. |
| 2016/0045066 | A1 | 2/2016 | Sands et al. |

FOREIGN PATENT DOCUMENTS

| | | |
|---|---|---|
| WO | 2001/146181 | 11/2011 |
| WO | 2012/063135 | 5/2012 |
| WO | 2014/008420 | 1/2014 |
| WO | 2014/144335 | 9/2014 |

OTHER PUBLICATIONS

Written Opinion for application PCT/US2014/028661, dated Mar. 14, 2014, 5 pages.

COOKING GAP CONTROL OF A COOKING APPARATUS

CROSS-REFERENCE TO RELATED APPLICATIONS

This application is a continuation of U.S. application Ser. No. 17/460,603, filed on Aug. 30, 2021, which is a continuation of U.S. application Ser. No. 14/775,294, filed Sep. 11, 2015 (now U.S. Pat. No. 11,116,357), which is a U.S. nationalization under 35 USC § 371 of International Application No. PCT/US2014/028661, filed Mar. 14, 2014, which claims priority from U.S. Provisional Application No. 61/798,241, filed on Mar. 15, 2013, the entirety of which is hereby fully incorporated by reference herein.

BACKGROUND OF THE INVENTION

Embodiments of the invention relate to a cooking apparatus having an upper and lower heating plate, and in particular to controlling the cooking of a food product based on pressure or descent rate of a heating unit.

Grills for cooking apply heat from a lower heating plate and from an upper heating plate to opposite sides of a food item to decrease cook times and to cook food evenly. In conventional systems, the gap between the upper heating plate and lower heating plate is set based on a food type, and food is cooked at the predetermined gap for a predetermined period of time. However, although food products are provided within predetermined specifications, such as having a thickness within a predetermined range, the food product thicknesses may vary. When food products having varying thicknesses are all cooked at the same gap for the same period of time, cooking quality may vary among the different food products.

BRIEF DESCRIPTION OF THE INVENTION

Embodiments of the present invention include a method of controlling a cooking apparatus. The method includes identifying an initial thickness of a food product on a lower heating plate of the cooking apparatus and calculating a difference between an initial gap value corresponding to the initial thickness of the food product and a predefined final gap value. The method includes controlling at least one of a pressure of at least one of an upper heating, plate and a lower heating plate on the food product and a rate of descent of the upper heating plate toward the lower heating plate based on the calculated difference between the initial gap value and the predefined final gap value.

Embodiments of the invention further include a cooking apparatus including a base including a lower heating plate and an upper heating unit including an upper heating plate. The apparatus also includes a controller configured to identify an initial thickness of a food product on the lower heating plate of the cooking apparatus, calculate a difference between an initial gap value corresponding to the initial thickness of the food product and a predefined final gap value, and control at least one of a pressure of at least one of the upper heating plate and the lower heating plate on the food product and a rate of descent of the upper heating plate toward the lower heating plate based on the calculated difference between the initial gap value and the predefined final gap value.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Conventional grilling apparatuses heat food from above and below, but may heat food unevenly due to different food product thicknesses. Embodiments of the invention relate to controlling the pressure and rate of descent of a cooking apparatus to heat food products of varying heights evenly.

Figure 1:
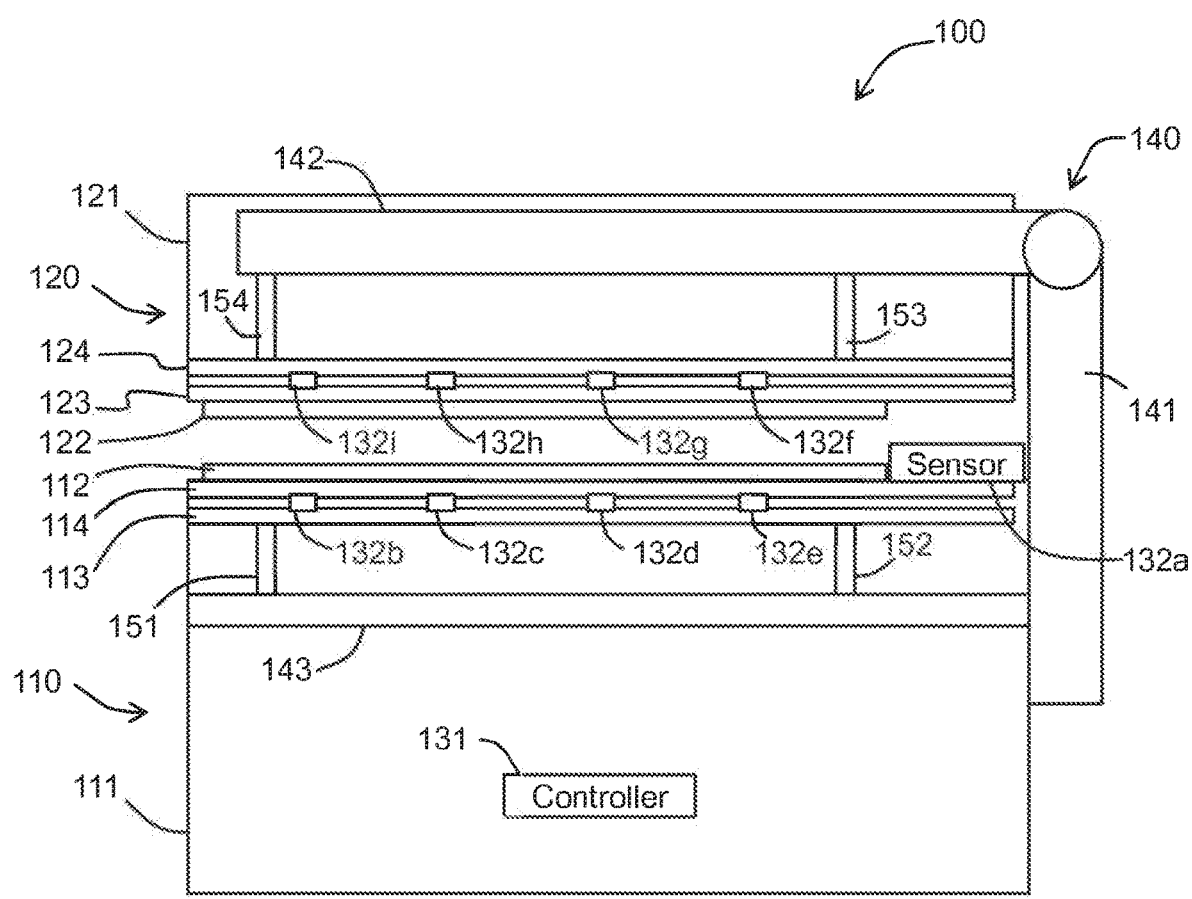
FIG. 1 is a block diagram of a cooking apparatus according to one embodiment of the invention.

FIG. 1 illustrates a cooking apparatus 100 according to an embodiment of the invention. In one embodiment, the cooking apparatus 100 is a grilling apparatus for grilling food. The cooking apparatus 100 includes a base 110 including a housing 111 that rests on the ground, floor or another surface. The base 110 also includes a lower heating plate 112. The cooking apparatus 100 also includes an upper heating unit 120 including a housing 121 and an upper heating plate 122.

In FIG. 1, one configuration of a cooking apparatus 100 is illustrated including a single heating plate 112 on a housing 111 and a single upper heating unit 120. However, embodiments of the invention encompass any configuration of base 110, lower heating plate 112, upper heating unit 120 and upper heating plate 122, including multiple lower or upper heating plates or multiple upper heating units 120.

A mounting structure 140 mounts the upper heating unit 120 to a fixed surface, such as the housing 111 of the base 110 as illustrated in FIG. 1. Alternatively, the mounting structure 140 may be fixed to any other surface, such as a ceiling, a wall or the ground. In the embodiment illustrated in FIG. 1, the mounting structure 140 includes a mounting base 141 and an actuator mounting part 142. In one embodiment, the mounting base 141 is moveable in a linear direction to linearly raise and lower the upper heating unit 120. In one embodiment, the actuator mounting part 142 is rotatable with respect to the mounting base 141 to raise and lower one end of the upper heating unit 120 with respect to the lower heating plate 112.

In the embodiment illustrated in FIG. 1, the upper heating unit 120 is suspended from the actuator mounting part 142 by actuators 153 and 154. The actuators 153 and 154 may be, for example, linear actuators, such as mechanical, electrical or hydraulic actuators that are controlled to raise and lower the upper heating unit 120 with respect to the base 110. The actuators 153 and 154 control a tilt, angle or attitude of the upper heating plate 122. The actuators 153 and 154 may also apply pressure to the upper heating plate 122, so that the upper heating plate 122 may apply pressure to a food product on the lower heating plate 112 that is greater than, just a weight of the upper heating unit 120.

The base 110 may also include an actuator support pail 143 and actuators 151 and 152, The actuators 151 and 152 may be controlled to control the tilt, angle or attitude of the lower heating plate 112. In an alternative embodiment, the base 110 does not include actuators 151 and 152, and instead the lower heating plate 112 is supported by a fixed surface or support structure.

The cooking apparatus 100 includes at least one sensor 132a to detect a food product on the lower heating plate 112. The sensor 132a may be, for example, a photo sensor, optical sensor or video sensor to capture images of a food product, and the controller 131 may identify the food product based on the images. In another embodiment, the sensor 132a may be an optical sensor or acoustic sensor to detect a height of a food product on the lower heating plate 112. In one embodiment, the sensor 132a detects the type of food product based on a thickness of the food product. While a few examples of sensors are provided, the sensor 132a may be any type of sensor capable of detecting information about the food product, about the location of the upper or lower heating plates 122 or 112 or about the gap between the upper and lower heating plates 122 and 112. In addition, while the sensor 132a is illustrates as being connected to the base 110, the sensor 132a may be located at any position capable of identifying a food product, including connected to the supper structure 140 or connected to the upper heating unit 120.

Embodiments of the invention encompass additional sensors 132b to 132e in the base 110 to detect characteristics of a food product or the cooking apparatus 100 and sensors 132f to 132i in the upper heating unit 120 to detect characteristics of a food product or the cooking apparatus 100. One or more of the sensors 132b to 132i may be a pressure sensor to detect a pressure exerted against a food product on the lower heating plate 112. In addition, one or more of the sensors 132b to 132i may be a position-detection sensor, such as an inclinometer, capable of detecting a position, angle or attitude of the upper heating plate 122 and the lower heating plate 112, In addition, one or more of the sensors 132b to 132i may be an accelerometer to detect a rate of descent or ascent of the upper heating unit 120 or the lower heating plate 112. In addition, the sensor 132a may be an optical sensor to detect the position of the upper heating unit 120 or a rate of descent of the upper heating unit 120.

FIG. 1 illustrates the sensors 132b to 132e positioned between a lower surface 113 and an upper sensor surface 114. The upper sensor surface 114 provides a buffer between the sensors 132b to 132e and the lower heating plate 112. In an embodiment in which one of the sensors 132b to 132e is a pressure sensor, one or more of the mounting base 141 and the actuators 151, 152, 153 and 154 may bring the upper heating plate 122 into contact with a food product on the lower heating plate 112. Once both the upper heating plate 122 and lower heating plate 112 are in contact with the food product, any additional movement of one or both of the upper heating plate 122 and the lower heating plate 112 towards each other results in pressure being registered in one of the pressure sensors 132b to 132e. The pressure may be monitored by the controller 131 which may control the mounting base 141 and the actuators 151 to 154 based on the detected pressure.

Similarly, the sensors 132f to 132i are positioned between a lower surface 123 and an upper sensor surface 124. The lower sensor surface 123 provides a buffer between the sensors 132f to 132i and the upper heating plate 122, In an embodiment in which one of the sensors 132f to 132i is a pressure sensor, one or more of the mounting base 141 and the actuators 151, 152, 153 and 154 may bring the upper heating plate 122 into contact with a food product on the lower heating plate 112. Once both the upper heating plate 122 and lower heating plate 112 are in contact with the food product, any additional movement of one or both of the upper heating plate 122 and the lower heating plate 112 towards each other results in pressure being registered in one of the pressure sensors 132f to 132i. The pressure may be monitored by the controller 131 which may control the mounting base 141 and the actuators 151 to 154 based on the detected pressure.

Embodiments of the invention encompass any type of sensor capable of providing position data or other cooking data to the controller 131. Examples of sensors include inclinometers, accelerometers, pressure sensors, temperature sensors, acoustic sensors and optical sensors. In embodiments of the invention, the controller 131 controls the position of the upper heating unit 120 and the lower heating plate 112 based on the received sensor data.

In operation, a food product is placed on the lower heating plate 112. One of the sensors 132a to 132i may detect the type of food product based on size, weight, image recognition, thickness or any other recognition process. Alternatively, a user may enter a control program selection indicating a type of food product that is placed on the lower heating plate 112. A cooking process may be initiated based on a user input, by sensing movement of the upper heating unit 120 to be positioned such that the upper heating plate 122 is above the lower heating plate 112, or by a combination of detecting a food product on the lower heating plate 112 and sensing that the upper heating plate 122 is in a cooking position. In embodiments of the invention, the identification of the food product by one or more of the sensors 132a to 132i may occur before or after the upper heating plate 122 is lowered towards the lower heating plate 112, and before or after the cooking process is initiated by a user.

One or more of the sensors 132a to 132i calculates an initial thickness of the food product on the lower heating plate 112. The controller 131 calculates a difference between an initial gap value corresponding to the initial thickness of the food product and a predefined final gap value based on the detected food. For example, when a first type of food product is detected, the controller 131 may set the final gap value between the upper and lower heating plates 122 and 112 to a first gap value. The controller 131 then calculates a difference between the initial gap value, based on the measured initial thickness of the food product, and the stored first gap value. The controller 131 controls at least one of the pressure exerted against the food product by one or both of the upper and lower heating plates 122 and 112 and the rate of descent of the upper heating plate 122 based on die calculated difference between the measured initial thickness of the food product and the stored or predefined first gap value.

If a second type of food product is detected, then a second gap value different than the first gap value may be used as the final gap value. In addition, if food products having different initial thicknesses are detected, then the controller 131 may determine if the food products are the same or different. If the products are the same, then the controller 131 sets the final gap value to be the same for the food products, but may control one or both of the pressure and the rate of descent of the upper and lower heating plates 122 and 112 to cook the food product having the greater initial thickness for longer than the food product having the lesser initial thickness.

In one embodiment, the lower heating plate 112 is fixed and not moveable by actuators. In such an embodiment, the controller 131 controls only the pressure exerted by the upper heating plate 122 against the food product on the lower heating plate 112, or the rate of descent of the upper heating plate 122 towards the lower heating plate 112 based on the calculated difference between the initial gap value corresponding to the measured initial thickness of the food product and the final gap value, which is a stored or predetermined value based on the type of food product on the lower heating plate 112. In embodiments of the invention, the rate of descent of the upper heating plate 122 towards the lower heating plate 112 is controlled after the upper heating plate 122 contacts at least one food product on the lower heating plate 112. The rate of descent may be controlled to increase a cook time of a thicker food product, for example.

In another embodiment, the upper heating plate 122 is fixed and not moveable by actuators in a cooking operation. For example, the mounting structure may move the upper heating unit 120 into a cooking position in which the upper heating plate 122 is positioned above and substantially parallel to the lower heating plate 112, and then the position of the lower heating plate 112 may be adjusted to apply pressure to a food product on the lower heating plate 112 while the upper heating plate 122 remains stationary. In yet another embodiment, both the upper heating plate 122 and the lower heating plate 112 may be moveable by actuators during a cooking operation to apply pressure to a food product on the lower heating plate 112.

The cooking process may be completed by sensing that the food product is cooked, based on an elapsed cook time or based on a combination of a position of the upper and lower heating plates 122 and 112 (such as being positioned to have the final gap value) and a predetermined cook time. The controller 131 may then generate a notice, such as a sound or visual notice, that the cooking process is finished, or the controller 131 may control the mounting structure 140 to lift the upper heating unit 120 up and away from the lower heating plate 112.

Figure 2:
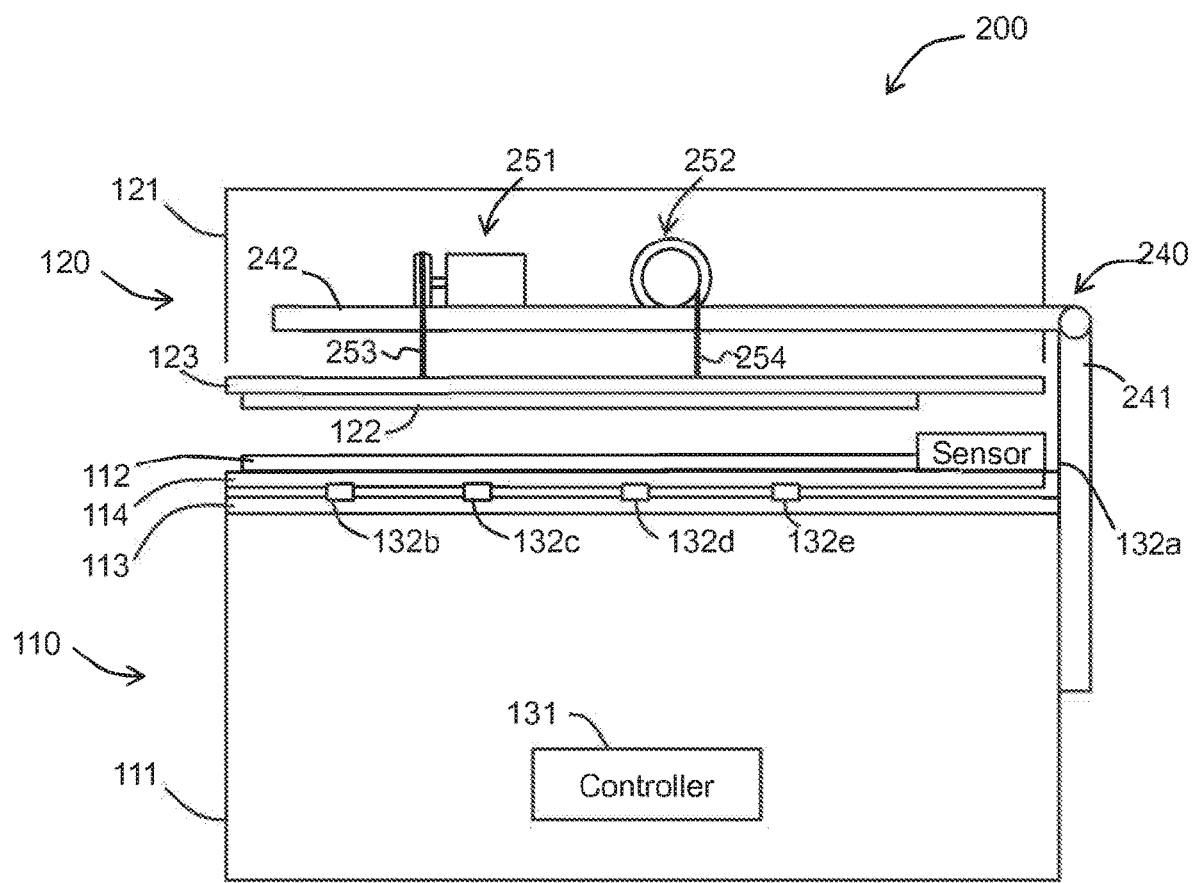
FIG. 2 is a block diagram of a cooking apparatus according to another embodiment of the invention.

In another embodiment illustrated in FIG. 2, the upper heating unit 120 is suspended from an actuator mounting part 242 of a support structure 240 by cables 253 and 254. The support structure includes a base mounting portion 241, which may include a linear actuator to raise and lower the actuator mounting part 242. The upper heating plate 122 is mounted to a lower surface 123 of the housing 121, and the lower surface 123 is suspended by the cables 253 and 254. The cables 253 and 254 are connected to rotating devices 251 and 252 which are mounted to the actuator mounting part 242. In one embodiment, the rotating devices 251 and 252 are motors, or pulleys that are driven by cables 253 and 254 controlled by motors. Since the upper heating plate 122 is held in suspension by the cables 253 and 254, the only pressure applied to an upper surface of a food product on the lower heating plate 112, is, at most, a pressure corresponding to a weight of the upper heating unit 120. Accordingly, in the embodiment illustrated in FIG. 2, controlling the pressure of the upper heating plate 122 on a food product includes, at most, increasing a pressure up to a pressure corresponding to the weight of the upper heating unit 120.

The rotation devices 251 and 252 are configured to raise and lower the upper heating plate 122 based on the rotation of the rotation devices 251 and 252, As the rotation devices 251 and 252 rotate in one direction, the cables 253 and 254 are fed out from a spool and a part of the lower surface 123 connected to the cables 253 and 254 and a corresponding part of the upper heating plate 122 are lowered, tilting the upper heating plate 122. As the rotation devices 251 and 252 rotate in an opposite direction, the cables 253 and 254 are retrieved by the spool and the part of the lower surface 123 connected to the cables 253 and 254 and the corresponding part of the upper heating plate 122 are raised, tilting the upper heating plate 122.

The combination of the rotation of the first and second rotation devices 251 and 252 allows the upper heating plate 122 to be positioned in a wide variety of angles and orientations, such the upper heating plate 122 may tilted, around multiple crossing axes, at a positive angle and a negative angle relative to a horizontal plane based on the rotation of the first and second rotation devices 251 and 252.

The cooking apparatus 100 further includes the controller 131 to control the rotation devices 251 and 252. The controller 131 includes a processing circuit, programmable logic, memory and any other circuitry for receiving, analyzing processing and transmitting data.

Operation of the cooking apparatus 200 of FIG. 2 is similar to the cooking apparatus 100 of FIG. 1, except that a maximum pressure that may be exerted against the food product corresponds to the weight of the upper heating unit 120. However, the controller 131 may still control one or more of the pressure (up to the maximum pressure) applied by the upper heating unit 120 onto a food product and a rate of descent of the upper heating plate 122 towards a lower heating plate 112 as discussed above with respect to FIG. 1.

Figure 3:
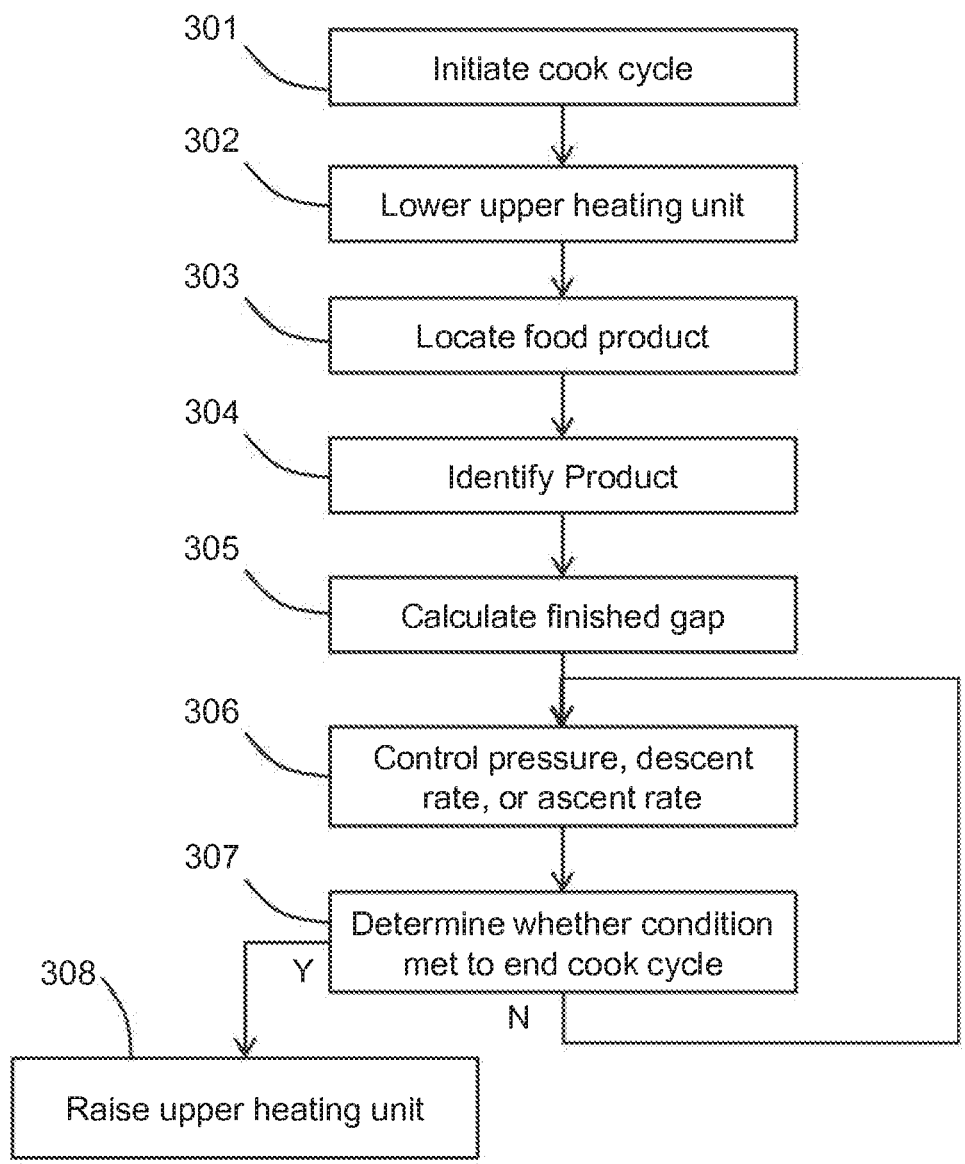
FIG. 3 is a flowchart illustrating a method according to an embodiment of the invention.

FIG. 3 illustrates a method according to an embodiment of the invention. In block 301, a cook cycle of a cooking apparatus is initiated. The cook cycle may be initiated by a user input or by sensing preset conditions to begin a cook cycle. For example, the preset conditions may include detecting that a food product has been placed on a lower heating plate and an upper heating plate has been lowered into a cooking position above the lower heating plate (block 302).

In block 303 a food product is located on the lower heating plate of the cooking apparatus, and in block 304 the product is identified. In one embodiment, the product is identified by the thickness of the product. For example, the cooking apparatus may be used to cook hamburger patties and the particular type of hamburger patty may be identified based on the thickness of the hamburger patty. Alternatively, the food product may be identified by image recognition, weight or by any other method.

In block 305, a finished gap is determined based on the identified food product. Each food product may have a finished gap associated with the food product. For example, when the food product identified, a controller may look up in memory the finished gap that is associated with the detected food product. A difference is detected between the finished gap value and the initial thickness of the food product. The difference may be calculated as an absolute value or as a percentage.

In block 306, one or more of the pressure and the rate of descent of an upper heating plate is controlled based on the calculated difference between the initial gap value, or the initial food product thickness, and the predetermined final gap value. For example, if the difference is relatively high, then the pressure or rate of descent may be decreased to increase a cook time of a thicker food product. Conversely, if the initial gap value is relatively low, then the pressure or rate of descent may be increased to decrease a cook time of a thinner food product. In an embodiment in which multiple food products of varying thicknesses are detected, a thicker food product may be cooked for a longer period of time than a thinner food product by controlling the pressure or rate of descent of an upper heating plate. The control of the rate of descent and pressure of the upper or lower heating plates improves a cooked food product quality by taking into account variations in food product thicknesses from a standard food product thickness, and variations in food product thicknesses of different food products that are on the lower heating plate at the same time. In art alternative embodiment, the rate of ascent of a lower heating plate may be controlled instead of the rate of descent of the upper heating plate. In yet another embodiment, a combination of the rate of ascent of the lower heating plate and a rate of descent of the upper heating plate is controlled.

In block 307, it is determined whether a condition is met to end the cook cycle. In one embodiment, the cook cycle ends after a predetermined period of time has elapsed. In another embodiment, the cook cycle ends only after a predetermined period of time has elapsed with the upper and lower heating plates in their final gap position. The upper and lower heating plates are moved into the final gap position after at least one of the upper and lower heating plates has been controlled based on pressure or rate of descent corresponding to the identified food product thickness. If the condition is met, the upper heating unit including the upper heating plate is raised in block 308. Otherwise, the cooking process continues in block 306 with the control of pressure and rate of descent of the upper heating plate.

In embodiments of the invention, a thickness of a food product is measured and used to determine a difference between the initial thickness and a final gap value. The difference is used to control at least one of pressure applied to a food product and descent rate of an upper heating unit to evenly cook the food product. Controlling the pressure or rate of descent, as opposed to just moving the upper and lower heating plates into a final gap value for a set period of time, provides for improved quality of a final food product by allowing for increased cook times of thicker food products and decreased cook times of thinner food products, which may result in a more even cooking quality on the food products of varying thicknesses.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of controlling a cooking apparatus, comprising:
    initiating a cooking cycle by positioning a food product upon a lower heating plate of a cooking appliance;
    detecting a food product on a lower heating plate with at least one sensor;
    identifying an initial thickness of a food product on the lower heating plate of the cooking apparatus;
    identifying a predetermined cook time for a food product;
    calculating whether a difference exists between an initial gap value corresponding to the initial thickness of the food product and a predefined final gap value;
    when the step of calculating the difference between the initial gap value corresponding to the initial thickness of the food product and the predefined final gap value results in a difference being calculated, adjusting the position of the lower heating plate with respect to an upper heating plate to result in compression of the food product disposed upon the lower heating plate until there is no longer a difference between the thickness of the food product and the predefined final gap value, and controlling a rate of ascent of the lower heating plate toward the upper heating plate based on the calculated difference between the initial gap value and the predefined final gap value;
    controlling the rate of ascent of the lower heating plate until the predefined gap value is reached; and
    sensing that the food product has been cooked based upon a combination of the predetermined final gap value being reached and the predetermined cook time being elapsed.

2. The method of claim 1, wherein identifying the initial thickness of the food product includes identifying the initial thickness of a first food product and a second food product, the first food product having a thickness greater than the second food product, and
    controlling the rate of ascent of the lower heating plate includes adjusting at least one of a pressure applied to a food product resting upon the lower heating plate by ascent of the lower heating plate toward the upper heating plate or the rate of ascent to cook the first food product for a period of time longer than the second food product.

3. The method of claim 1, wherein identifying the initial thickness of the food product includes identifying an initial thickness of a first food product and a second food product, the first food product having an initial thickness greater than the second food product, the method further comprising:
    identifying the first and second food products being of a same type;
    setting a final gap value for each of the first and second food products to be the same based on the identifying the first and second food products as being of the same type; and
    controlling at least one of the pressure or the rate of ascent of the lower heating plate to cook the first food product for longer than the second food product.

4. The method of claim 1, wherein controlling the rate of ascent of the lower heating plate further comprises adjusting the pressure applied to a food product resting upon the lower heating plate by ascent of the lower heating plate toward the upper heating plate based on the calculated difference between the initial gap value and the predefined final gap value.

5. The method of claim 1, further comprising controlling the pressure applied to a food product resting upon the lower heating plate by ascent of the lower heating plate toward the upper heating plate until the predefined gap value is reached.

6. A cooking apparatus, comprising:
    a base including a lower heating plate;
    an upper heating unit including an upper heating plate; and
    a controller configured to detect a food product on the lower heating plate with at least one sensor, identify an initial thickness of the detected food product on the lower heating plate of the cooking apparatus, calculate whether a difference exists between an initial gap value corresponding to the initial thickness of the food product and a predefined final gap value, and when the step of calculating the difference between the initial gap value corresponding to the initial thickness of the food product and the predefined final gap value is complete, adjusting the position of the lower heating plate with respect to an upper heating plate to result in compression of the food product disposed upon the lower heating plate until there is no longer a difference between the thickness of the food product and the predefined final gap value, and controlling a rate of ascent of the lower heating plate toward the upper heating plate based on the calculated difference between the initial gap value and the predefined final gap value, controlling the rate of ascent of the lower heating plate until the predefined gap value is reached; and sensing that the food product has been cooked based upon a combination of the predetermined final gap value being reached and the predetermined cook time being elapsed.

7. The cooking apparatus of claim 6, further comprising at least one food product sensor configured to detect the initial thickness of the food product and transmit a corresponding food product sensor signal to the controller.

8. The cooking apparatus of claim 7, wherein controlling the rate of ascent of the lower heating plate includes adjusting the rate of ascent of the lower heating plate toward the upper heating plate based on the calculated difference between the initial gap value and the predefined gap value.

9. The cooking apparatus of claim 6, further comprising an accelerometer to detect the rate of ascent of the lower heating plate.

10. The cooking apparatus of claim 9, wherein further comprising controlling the pressure applied to a food product resting upon the lower heating plate by ascent of the lower heating plate toward the upper heating plate and controlling the rate of ascent of the lower heating plate includes controlling at least one of a motor and an actuator to adjust the pressure of at least one of the upper heating plate and the lower heating plate on the food product based on the calculated difference between the initial gap value and the predefined final gap value.

11. The cooking apparatus of claim 6, wherein identifying the initial thickness of the food product includes identifying the initial thickness of a first food product and a second food product, the first food product having a thickness greater than the second food product, and controlling the rate of ascent of the lower heating plate includes controlling at least one of a motor or an actuator to adjust the rate of ascent to cook the first food product for a period of time longer than the second food product.

12. The cooking apparatus of claim 11, wherein the controller is configured to control at least one of a motor and an actuator to control the rate of ascent of the lower heating plate until the predefined gap value is reached, and the controller is configured to maintain the upper heating plate and the lower heating plate in position after the predefined gap value is reached until a predetermined cook cycle ending condition is detected.

\* \* \* \* \*